J. H. CARY.
LOCK NUT.
APPLICATION FILED APR. 14, 1917.

1,276,175.

Patented Aug. 20, 1918.

INVENTOR
JAMES H. CARY
BY
A. T. Palmer
ATT'Y.

UNITED STATES PATENT OFFICE.

JAMES H. CARY, OF BOSTON, MASSACHUSETTS, ASSIGNOR OF ONE-HALF TO WILLIAM HENRY GRIFFITH, OF NARRAGANSETT PIER, RHODE ISLAND.

LOCK-NUT.

1,276,175.  Specification of Letters Patent.  Patented Aug. 20, 1918.

Application filed April 14, 1917. Serial No. 162,173.

*To all whom it may concern:*

Be it known that I, JAMES H. CARY, a citizen of the United States, residing at Boston, in the county of Suffolk and Commonwealth of Massachusetts, have invented a new and useful Improvement in Lock-Nuts, of which the following is a specification.

This invention relates to lock-nuts and is in the nature of an improvement on my previous Patent No. 1,218,168, dated Mar. 6, 1917, where I show a reversible structure for locking the nut in either direction.

I have found, in practice, that it is desirable to provide means for retaining the pin in operative position within the opening formed in the nut to receive it, when the latter is not assembled upon its bolt; and so I have devised such means and here illustrate one embodiment of the same, without limiting myself to the precise construction shown.

In the above patent, the spring serves to retain the pin only when the nut is assembled upon the bolt. In practice, there are some cases where such retention would be sufficient; but, generally speaking, it is preferable to make and ship the nuts without the bolts and, to prevent loss of the locking parts, during shipment or in handling prior to assembling upon the bolts, I have devised the present means whereby such loss is prevented and the work of assembling is reduced to a minimum. In fact, my improved lock-nut is handled in the same manner as an ordinary nut, the locking being entirely automatic in its action. Only in the case of reversing the lock is extra handling necessary and such reversal is merely incidental to the present invention and not an essential feature thereof.

In the drawings, which accompany and form part of this specification,—

Figure 1:
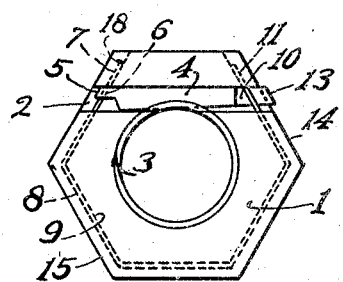
Figure 1 is a face view of a nut equipped with the preferred form of my device.

The nut 1 is provided with a transverse opening 2 that is, substantially tangential to the bolt-hole 3. A tapered pin 4, shown in the first five figures as triangular in cross-section, is adapted to occupy opening 2 and, to insure the engagement of one of its edges with the bolt-thread, when assembled thereon, I provide a flattened portion 5 at one end which has an opening 6 therethrough for the passage of the end 7 of a piano-wire spring 8. Spring 8 is adapted to occupy a circumferential groove 9 on the face of nut 1 and is formed to clasp the nut on five sides so as to prevent its dropping out. At the opposite end of pin 4, I provide another flattened portion 10, preferably at right-angles to the portion 5, said portion 10 being adapted to underlie the opposite end 11 of spring 8. In this way, the pin 4 is prevented from changing its position in opening 2, with a slight exception, as will be later referred to.

The circumferential groove 9 is cut across five of the wrench faces, as shown, and the spring 8, lying entirely within this groove, can offer no obstruction to the action of a wrench.

As the pin 4 is not to be removed from opening 2, some means must be employed to enable nut 1 to be removed from bolt 12, after it has been once locked thereon. One such means is clearly shown in Figs. 1 and 4 where I provide an extension 13 on the flattened portion 10 such that said extension will always protrude slightly beyond the face of the nut. Fig. 1 shows the nut unassembled and the projection is there somewhat in excess of that seen in Fig. 4, for a reason that will presently appear.

When it is desired to unlock nut 1, the wrench is clasped upon faces 14 and 15 and the releasing pressure of the wrench forces the extension 13 back, against the action of spring 8, until its end is flush with face 14. The nut may now be unscrewed by means of the wrench constantly retaining its grip upon faces 14 and 15. In this way, the action of unlocking is, like that of locking, entirely automatic.

Figure 4:
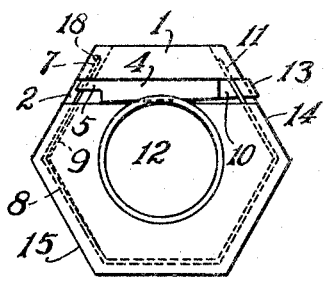
Fig. 4 is a face view of the nut assembled upon a bolt.

In Fig. 4, the end 7 of spring 8 is shown as being slightly clear of the bottom of groove 9. This is due to the fact that pin 4 is then frictionally engaged with the thread of bolt 12 and, while there is constant pressure of spring 8 to contact said bottom, such contact is neither possible nor desirable.

Figure 2:
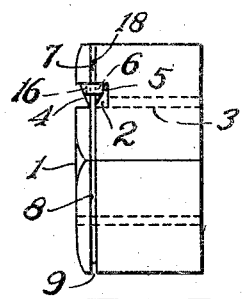
Fig. 2 is an edge view of Fig. 1, viewed from the left.
Figure 3:
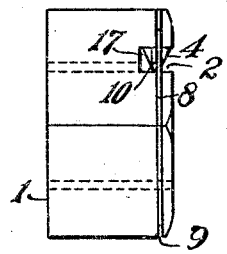
Fig. 3 is an edge view of Fig. 1, viewed from the right.
Figure 5:
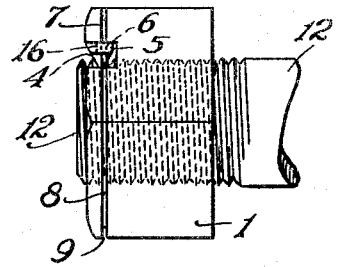
Fig. 5 is an edge view, from the left, of Fig. 4.

In Figs. 2 and 5, 16 represents an enlargement of opening 6, to coöperate with a slight clearance marked 17 in Fig. 3, at the opposite end of pin 4, to permit the same to easily find and engage the thread on bolt 12, when assembling. This slight adjustment marks the exception previously noted which, while desirable, is not absolutely essential where extreme care is taken in machining the parts.

Inspection of the drawings will reveal the fact that pin 4 may be easily reversed in its opening 2, if a lock in the opposite direction is desired.

Figure 6:
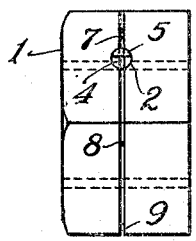
Figs. 6 and 7 are, respectively, face and edge views of a modified form.
Figure 7:
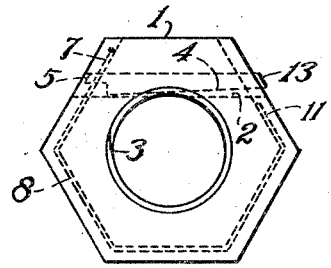

In Figs. 6 and 7 I show the opening 2 as circular and drilled transversely at or near the center of nut 1. In this case, the end 11, of spring 8, need not engage the small end of pin 4.

What I claim is:

1. A nut adapted to engage a suitably threaded bolt and provided with a transverse opening that is, substantially, tangential to the bolt-hole; a pin adapted to reversely occupy said opening; and reversible means adapted to engage both ends of said pin and retain it within said opening; in combination with means for attaching one end of said pin to said reversible means.

2. In a lock-nut, a tapered pin with a V-shaped edge, said pin being provided with a perforation at the large end; and a spring formed to clasp a suitable nut; in combination with means for positively attaching one end of said spring to said perforation.

Boston, Mass., April 13th, 1917.

JAMES H. CARY.